Nov. 24, 1931. J. L. BENNETT 1,832,853
METHOD AND APPARATUS FOR DENITRATING ACID MIXTURES
AND CONCENTRATING ACID MIXTURES
Filed Oct. 26, 1928
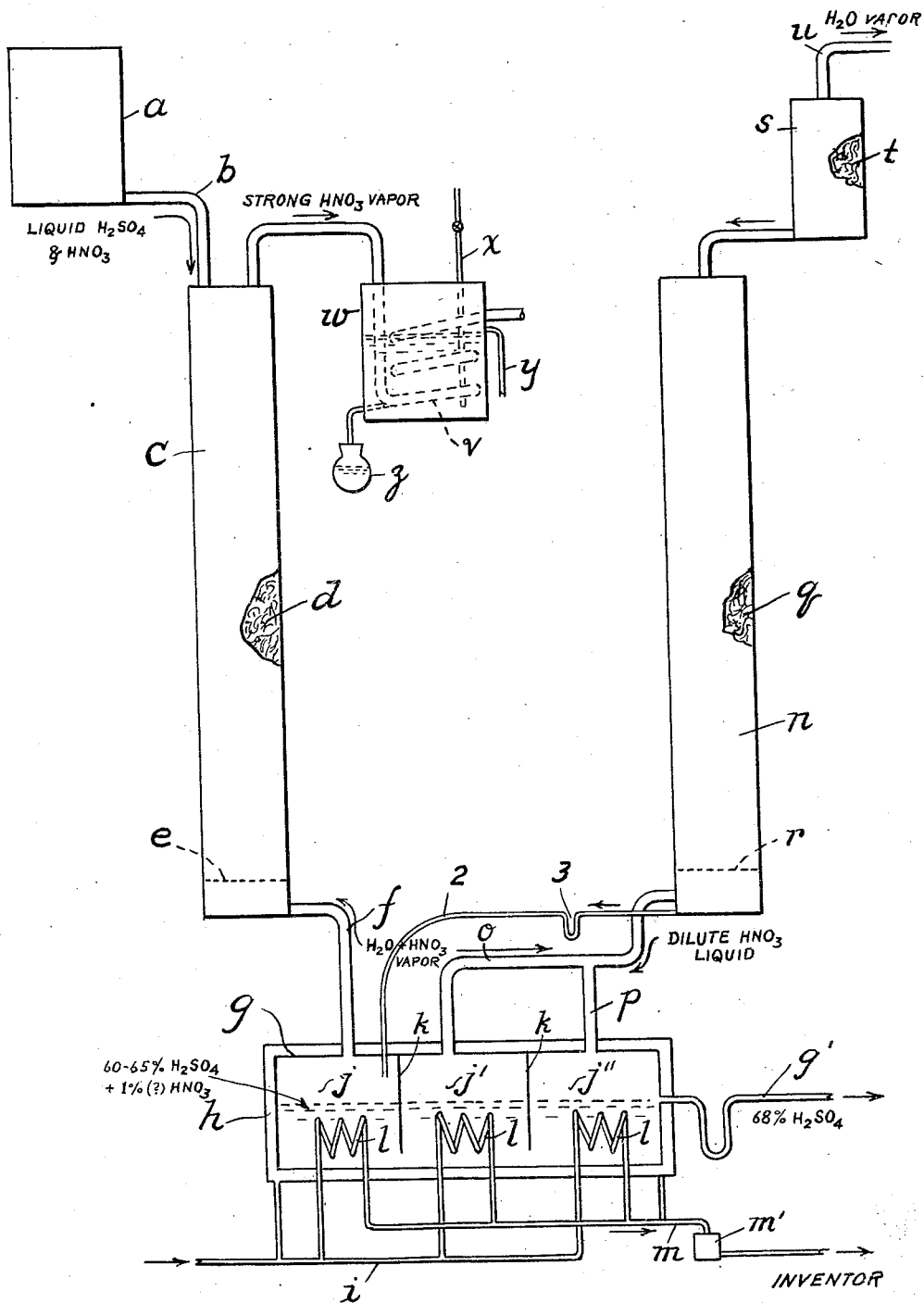
INVENTOR
James L. Bennett
BY
ATTORNEYS.
WITNESS:

Patented Nov. 24, 1931

1,832,853

UNITED STATES PATENT OFFICE

JAMES L. BENNETT, OF WILMINGTON, DELAWARE, ASSIGNOR TO HERCULES POWDER COMPANY, OF WILMINGTON, DELAWARE, A CORPORATION OF DELAWARE

METHOD AND APPARATUS FOR DENITRATING ACID MIXTURES AND CONCENTRATING ACID MIXTURES

Application filed October 26, 1928. Serial No. 315,184.

My invention relates to a method and apparatus for denitrating acid mixtures and more particularly for effecting the concentration of nitric acid.

Heretofore (U. S. Patent No. 1,197,167, September 5, 1916) it has been suggested that the concentration of nitric acid be effected by passing dilute nitric acid and a dehydrating agent, as sulphuric acid, into a chamber and driving off the nitric acid by contacting therewith water vapors from a boiling aqueous solution of the dehydrating agent, the nitric acid driven off being condensed as strong nitric acid. Such process, while theoretically advantageous, is open to the serious defect in that it will not be operative for the production of concentrated nitric acid unless a large excess of the dehydrating agent be used, since otherwise the water vapor, from the boiling aqueous solution of the dehydrating agent, relied on to drive off the nitric acid, will be in such excess as to substantially dilute and weaken the concentrated nitric acid driven off. In other words, such process, while theoretically practical, will not produce the desired result in the absence of substantial excess of dehydrating agent.

Now it is the object of my invention to provide a method and apparatus adapted for the denitration of acid mixtures, or the concentration of nitric acid of such character as to avoid the necessity for any substantial excess of dehydrating agent, and whereby not only is the process rendered more economical but the obtaining of the desired concentrated nitric acid is assured.

In accordance with my invention a mixture of dilute nitric acid and a dehydrating agent, as sulphuric acid, phosphoric acid, anhydrous sodium sulfate, or the like, are passed, in liquid form, in counter current to water vapor and nitric acid vapor boiled from an accumulation of the acid mixture which is partly denitrated by contact with such vapors, the quantity of water vapor contacted with the acid mixture, however, being so controlled, irrespective of the accumulation of partially denitrated acid mixture, as to avoid any excess which would dilute the nitric acid separated from the acid mixture. In the practical adaptation of my invention, I so accumulate and boil the partially denitrated acid mixture as to apportion to contact with the mixture to be denitrated only such quantity of vapors as will contain such water vapor as is necessary to drive off the nitric acid from the mixture, while at the same time effecting the recovery of nitric acid from the balance of the vapors boiled off from the accumulation.

The method in accordance with my invention will be understood from the following description of a form of apparatus embodying my invention and which is illustrated diagrammatically by the accompanying drawing, it being understood that the carrying out of the method is not dependent upon the use of any particular form of apparatus and that the apparatus illustrated may be widely varied in detail without departing from my invention.

Referring now to the accompanying drawing, in which an apparatus embodying my invention is illustrated diagrammatically, $a$ indicates a container for a mixture of acids which may be composed, for example, of 30% $HNO_3$, 50% $H_2SO_4$ and 20% $H_2O$.

The container $a$ is connected by a pipe $b$ with a tower $c$, packed with a suitable acid proof packing $d$ supported by a suitable perforated support $e$. Beneath the tower $c$ and connected thereto by a pipe $f$ is a vessel $g$ formed from acid proof material and provided with hollow walls $h$ into which steam may be fed from a suitable source through a pipe $i$ for the purpose of heating the vessel. The vessel $g$ is divided into three compartments $j$, $j'$ and $j''$ by means of partitions $k$ spaced from the bottom of the vessel to permit the passage of liquid but not of vapor from one compartment to another. Each of the compartments $j$, $j'$ and $j''$ contains a steam coil $l$ receiving steam from pipe $i$, which is also connected to the interior of the hollow walls of vessel $g$, while a pipe $m$, provided with a steam trap $m'$, serves for discharge of steam from the coils and from the walls of vessel $g$.

The pipe $f$ affords communication between the tower $c$ and compartment $j$ of vessel $g$, while compartments $j'$ and $j''$ are connected with the tower $n$ by a pipe $o$ connected to the tower at a point above its bottom and a branch $p$ therefrom, respectively. A pipe 2, provided with a bend forming a trap 3, is connected at one end to the tower $n$ at its bottom, while its other end extends into chamber $j$. The tower $n$ is packed with acid resisting material $q$, supported on a perforated acid proof plate $r$. The vessel $g$ is provided with an overflow pipe $g'$ to maintain a level in the vessel well above the lower edges of partitions $k$.

The top of tower $n$ is connected to a reflux condenser $s$ packed with a suitable acid resistant packing $t$ and provided at its top with an outlet $u$. The top of tower $c$ is connected to a condenser comprising a coil $v$ within a casing $w$ into which cooling water is introduced through a pipe $x$, an overflow pipe $y$ being provided to maintain a level. The coil $v$, at its low point, is connected by a suitable pipe to a receiver $z$ adapted to receive condensed nitric acid, and the end of the coil discharges into an absorption tower, not shown, wherein any lower oxids of nitrogen resulting from unavoidable decomposition of nitric acid are absorbed.

In the carrying out of the method in accordance with my invention a mixture of acids, for example, comprising 30% $HNO_3$, 50% $H_2SO_4$ and 20% $H_2O$, is provided in container $a$ and a mixture of sulphuric acid and water, say 60–65% $H_2SO_4$, in quantity to fill the vessel up to the overflow pipe $g'$, is provided in the vessel $g$. The vessel $g$ is heated, by the admission of steam to coils $l$ and to the interior of the walls of the vessel, to boil off water vapor from the mixture therein. The vapors boiled off in the compartment $j$ pass through pipe $f$ and flow upwardly in tower $c$ in counter flow to the downward flow of the mixture of acids from container $a$, while the vapors from compartments $j'$ and $j''$ pass through pipe $o$ and branch $p$ into tower $n$. The down-flowing mixture of acids in tower $c$ is denitrated by the water vapor from chamber $j$ and the nitric acid vapors pass from the tower into coil $v$ wherein they are condensed and from which the concentrated nitric acid passes to receiver $z$. The denitrated, or partly denitrated acid mixture flows from the bottom of tower $c$ into chamber $j$ of vessel $g$ through pipe $f$ and the flow of vapors from chamber $j$ through pipe 2 is prevented by the trap 3, which is full of liquid, as will be described. The original sulphuric acid and water in vessel $g$ is displaced by the partly denitrated mixture, from tower $c$, which may, for example, comprise say about 55%–65% $H_2SO_4$ and say about 1%–3% $HNO_3$, and which is boiled in vessel $g$ producing vapors of water and of such nitric acid as was not removed from the acid mixture in tower $c$. The nitric acid vapors produced in vessel $g$ and passing to tower $c$ through pipe $f$ will pass from the tower $c$ to the condenser with the nitric acid removed from the acid mixture fed into the tower.

As has been indicated, the vessel $g$ is divided into compartments from only one of which water vapor passes to the tower $c$ and such compartment is of such size that the water vapor passing therefrom to the tower $c$ amounts only to that which is necessary for denitration of the acid mixture in the tower. In other words, the vessel $g$ is divided into compartments from only one of which water vapor passes into the tower and such compartment is of a size such that the water vapor passing therefrom to the tower supplies the necessary water vapor without gases which would necessitate an excess of dehydrator. The size of the compartment of vessel $g$, which communicates with tower $c$ will, of course, vary with the size of the tower in amount and rate of flow of the acid mixture denitrated, but, as will be obvious to anyone skilled in the art, the size of the compartment for any given tower may be readily determined.

The acid mixture in its passage through tower $c$ is not completely denitrated and it will be noted that such nitric acid as passes into vessel $g$ will be recovered either by return in vapor form from chamber $j$ to tower $c$, with subsequent passage to the condenser with separated nitric acid, or by passage with water vapor from chambers $j'$ and $j''$ through pipe $o$ and branch $p$ into tower $n$ and the reflux condenser $s$ in which the nitric acid will be condensed, to flow back from the bottom of tower $n$ to chamber $j$ of vessel $g$, through pipe 2, for vaporization and eventual passage into tower $c$, and from which the water vapor will be discharged through outlet $u$. The nitric acid flowing from tower $n$ to compartment $j$ through pipe 2 fills the trap 3 and, as has been indicated, prevents the flow of vapors from chamber $j$ through pipe 2.

In connection with the above description of my invention, it will be understood that the nitric and sulphuric acid may be introduced into tower $c$ as a mixture, or separately if desired and that the vessel $g$, or its equivalent, may be divided into two or more compartments as compared to three compartments as described, or the requisite amount of water vapor may be supplied to the tower $c$ in any other manner from the partially denitrated mixture or from other source. It will also be understood that the relative strengths and proportions of acids indicated above may be varied without departing from my invention.

It will be understood that the carrying out of the method embodying my invention is not dependent upon the use of any particular form of apparatus.

Having now fully described my invention, what I claim and desire to protect by Letters Patent is:

1. The method of concentrating nitric acid which includes passing aqueous nitric acid and a dehydrator in counter flow with a mixture of steam and nitric acid vapor, while avoiding dilution of separated nitric acid in the absence of any substantial excess of the dehydrator through control of the steam.

2. The method of concentrating nitric acid which includes passing aqueous nitric acid and a dehydrator in counter flow with a mixture of steam and nitric acid vapor to effect partial denitration of the mixture, heating the partially denitrated mixture to generate steam and nitric acid vapor and utilizing a portion of the generated steam for the denitration of further quantities of acid mixture.

3. The method of concentrating nitric acid which includes passing aqueous nitric acid and a dehydrator in counter flow with a mixture of steam and nitric acid vapor to effect partial denitration of the mixture, collecting the partially denitrated mixture and subjecting it to heat for the generation of steam and nitric acid vapor and diverting a portion of the steam generated to the denitration of further quantities of acid mixture.

4. The method of concentrating nitric acid which includes passing aqueous nitric acid and a dehydrator in counterflow with a mixture of steam and nitric acid vapor to effect partial denitration of the acid, heating the partially denitrated acid to generate steam, and nitric acid vapor utilizing a portion of the generated steam for the denitration of further quantities of acid and effecting the separation of nitric acid from the balance of the steam generated.

5. The method of concentrating nitric acid which includes passing aqueous nitric acid and a dehydrator in counter flow with a mixture of steam and nitric acid vapor to effect partial denitration of the mixture, heating the partially denitrated mixture to generate steam, and nitric acid vapor utilizing a portion of the generated steam for the denitration of further quantities of acid mixture and at the same time effecting the separation of nitric acid from such steam and effecting the separation of nitric acid from the balance of the steam generated.

6. Apparatus for the concentration of nitric acid including, in combination, a tower for contacting aqueous nitric acid and a dehydrator with steam, a vessel for the collection of acid mixture from the tower, means for dividing said vessel into compartments connecting at a point below the normal level of the mixture in said vessel, means for generating steam and nitric acid vapor from the mixture in said vessel and a conduit for the passage of steam and nitric acid vapor to said tower from one of said compartments only.

7. Apparatus for the concentration of nitric acid including, in combination, a tower for contacting aqueous nitric acid and a dehydrator with steam, a vessel for the collection of acid mixture from the tower, means for dividing said vessel into compartments connecting at a point below the normal level of the mixture in said vessel, means for generating steam and nitric acid vapor from the mixture in said vessel, and means for separating nitric acid from steam in communication with another of said compartments.

In testimony of which invention, I have hereunto set my hand, at Wilmington, Delaware, on this 18th day of October, 1928.

JAMES L. BENNETT.